(12) United States Patent
Smith et al.

(10) Patent No.: US 6,617,394 B2
(45) Date of Patent: Sep. 9, 2003

(54) DIMER ACID DERIVATIVES AS ENHANCERS

(75) Inventors: Cynthia L. Smith, Marysville, OH (US); Dennis H. Fisher, Westerville, OH (US)

(73) Assignee: Ashland Inc., Dublin, OH (US)

( * ) Notice: Subject to any disclaimer, the term of this patent is extended or adjusted under 35 U.S.C. 154(b) by 0 days.

(21) Appl. No.: 09/960,082

(22) Filed: Sep. 21, 2001

(65) Prior Publication Data

US 2003/0092841 A1 May 15, 2003

(51) Int. Cl.$^7$ ................................ C08L 67/06
(52) U.S. Cl. ................ 525/28; 525/32.1; 525/168; 525/169; 525/170; 525/171
(58) Field of Search .................. 525/32.1, 168, 525/169, 170, 171, 28

(56) References Cited

U.S. PATENT DOCUMENTS 4,054,561 A * 10/1977 Strauss ................ 525/32.1
4,100,224 A * 7/1978 Hess .................... 525/166

* cited by examiner

*Primary Examiner*—Patricia A. Short
(74) *Attorney, Agent, or Firm*—Martin Connaughton

(57) ABSTRACT

The invention relates to low molecular weight LPA surface quality enhancers derived from $C_{36-44}$ dimer acids capped with a glycol or a polyether polyol. The capped dimer acids are incompatible in the cured matrix of a polyester molding composition.

9 Claims, No Drawings

US 6,617,394 B2

DIMER ACID DERIVATIVES AS ENHANCERS

BACKGROUND OF THE INVENTION

The invention relates to surface quality enhancer additives for use with unsaturated polyester resins in molded plastic parts applications. Compression molded parts are known in the art and used in a variety of applications. Low shrinkage, or low-profile polyester molding compositions such as sheet-molding compounds (SMC) are of particular importance in the transportation industry, because they can be used as molded parts where smooth surfaces having high-gloss surfaces are desired. SMC typically includes an unsaturated polyester resin, a thermoplastic low-profile additive (LPA) resin such as a polyurethane, polyvinylacetate, polymethylmethacrylate, polystyrene, or saturated polyester, a cross-linking vinyl monomer, an initiator such as a t-butyl perbenzoate, a thickening agent, a mineral filler, and reinforcing fiber material. With surface quality being of increasing importance much has been done to improve surface quality without negatively affecting the physical properties of the molded parts. LPAs are used to improve the surface quality of plastic parts. These additives are called low-profile additives because they decrease the surface roughness and improve surface smoothness or "profile". When a surface is rough a cross-section under magnification shows peaks and valleys. An effective LPA reduces the difference between the peaks and valleys. However, even the best LPA does not provide a mirror like surface to plastic parts. Attempts to enhance surface quality by adding materials in addition to LPAs have been explored. U.S. Pat. No. 4,622,354 discloses the addition of a phase stabilizing material to improve glass readout and provide for a Class-A surface in polyester compositions using a dual thickening mechanism. U.S. Pat. No. 4,673,706 adds vinyl monomers and epoxy compounds to improve cure shrinkage. U.S. Pat. No. 5,102,926 discloses citrate esters which are compatible with curing unsaturated polyester resins and that improve surface characteristics when used with LPAs. U.S. Pat. No. 5,089,544 discloses a group of components that remain compatible with a curing unsaturated polyester resin and that improves surface characteristics when used in conjunction with LPAs. U.S. Pat. No. 5,504,151 discloses oligomers capped with $C_{8-22}$ fatty acids. When the polycapped oligomers are used in conjunction with LPAs they increase the efficiency of the LPA. U.S. Pat. No. 5,880,180 discloses aldimine additives that when used in conjunction with LPAs improve the surface quality of plastic parts molded from sheet-molding composite.

BRIEF SUMMARY OF THE INVENTION

The invention relates to low molecular weight surface quality enhancers that are incompatible in the cured matrix of a polyester thermoset molding composition. The invention also relates to the use of said enhancers to improve the efficiency of Low Profile Additives (LPA) in molded compositions. The enhancers are dimer acid derivatives, synthesized by capping a dimer acid with a glycol or a polyether polyol. A dimer acid is defined as a $C_{36-44}$ aliphatic diacid prepared by oxidative coupling of $C_{18-22}$ unsaturated monoacids. Some trimer acids may be present in the dimer acid. The number average molecular weight (Mn) for the dimer acid derivatives of the present invention is from about 500 to about 2000.

BRIEF DESCRIPTION OF THE SEVERAL VIEWS OF THE DRAWINGS-NOT APPLICABLE

DETAILED DESCRIPTION OF THE INVENTION

The present invention comprises low molecular weight surface quality enhancers derived from capping dimer acid with a glycol or polyether polyol that are incompatible in the cured matrix of a polyester thermoset molding composition and where the addition of said enhancers improves the efficiency of LPAs in the molding compositions.

The first ingredient of the polyester resin system in which the polycapped oligomer of this invention is used is an unsaturated polyester resin. These are typically made by reacting unsaturated acids or anhydrides with polyhydric alcohols, using methods and reactants well known to those skilled in the art of polyester technology. See, for example, Kirk-Othmer, *Encyclopedia of Chemical Technology*, Third Edition, Volume 18, pages 575–580 (1982), the entire disclosure of which is incorporated herein by reference. Typical reactants include maleic acid, fumaric acid, aconitic acid, mesaconic acid, maleic arthydride, itaconic arthydride, citraconic anhydride, mixtures thereof, and the like, and glycols, such as ethylene glycol, diethylene glycol, triethylene glycol, polyethylene glycol, propylene glycol, dipropylene glycol, polypropylene glycol, 1,3-butanediol, 1,4-butanediol, neopentyl glycol, cyclohexanedimethanol, 2,2,4-trimethylpentanediol, ethoxylated and/or propoxylated, bisphenol A, trimethylolethane, hydrogenated bisphenol A, trimethylolpropane, dicylopentadiene glycol, dibromonoeopentyl glycol, mixtures thereof, and the like. Under some circumstances, the polyester resins may further contain, as co-condensed units, other compounds, such as dibasic aromatic acids and anhydrides and saturated aliphatic dibasic acids, which act as modifiers. Such compounds include phthalic anhydride, isophthalic acid, adipic acid, succinic acid, azelaic acid, sebacic acid, etc. as well as terephthalic acid, various hydrogenated phthalic anhydride derivatives, trimellitic anhydride, cyclohexane-dicarboxylic acid, the anhydrides of chlorendic, tetrabromophthalic and tetrachlorophthalic acids, and so forth. Both amorphous and crystalline unsaturated polyester resins and mixtures thereof are used.

The second ingredient of the resin composition is a thermoplastic additive for improving the surface quality of molded articles. These are commonly referred to as low profile additives (LPAs). One such additive is the URAL-LOY hybrid polymer low profile additive available from Ashland Specialty Chemical Company, Division of Ashland Inc. This is a polyurethane oligomer reaction product of an isocyanate-terminated prepolymer and a polyester polyol described in U.S. Pat. No. 4,421,894 which is expressly incorporated herein by reference. Other low profile additives, similarly useful with the additive of this invention, include polyvinylacetate polymers and copolymers, polyacrylates, polymethacrylates, and copolymers such as polymethylmethacrylate, polymethylacrylate, polybutylacrylate, and saturated polyesters prepared from dibasic acids or anhydrides such as succinic, adipic, sebacic, phthalic, isophthalic, terephthalic, trimellitic and the like reacted with glycols such as ethylene glycol, diethylene glycol, propylene glycol, dipropylene glycol, neopentyl glycol, glycols of polyethylene oxide glycol, glycols of polypropylene oxide, butanediol, cyclohexane dimethanol and the like. Also included are various styrene polymers and copolymers such as polystyrene-butadiene, etc.

The third ingredient of this resins system is one or more olefinically unsaturated monomers which copolymerize with the unsaturated polyester ingredient. Useful monomers include styrene, methyl methacrylate, divinyl benzene, alpha-methyl styrene, vinyl acetate, various alkyl acetates and methacrylates, and the like. The most frequently used and preferred monomer is styrene.

The fourth ingredient of the resin composition is the additive of this invention. This material is prepared by reacting dimer acid with a low-molecular weight glycol or polyether polyol, or mixtures thereof. The product is a capped derivative of dimer acid. The dimer acid is a C36 to C44 aliphatic diacid typically prepared by the oxidative coupling of C18 to C22. unsaturated monoacids. Glycols that are reacted with dimer acid include ethylene glycol, propylene glycol, diethylene glycol, dipropylene glycol, neopentyl glycol, glycols of polyethylene oxide, glycols of polypropylene oxide, butanediol, cyclohexane dimethanol and the like. The preferred glycols are propylene glycol, diethylene glycol, poly(ethylene glycol) (Mn=200–400), and poly(propylene glycol) (Mn=200–400). Generally the number average molecular weight of this reacted product is low, preferably it is less than 2000.

Additional optional ingredients include mold releases such as zinc stearate and calcium stearate, fillers such as calcium carbonate, fly ash, wood flour, mica, glass or ceramic beads, cure accelerators such as organic cobalt compounds, cure initiators such as peroxyesters, dialkyl peroxides, alkyl aryl peroxides, diaryl peroxides, peroxy ketals and ketone peroxides. Inhibitors such as butyl hydroxy toluene (BHT), parabenzoquinone (PBQ), hydroquinone (HQ), tetrahydroquinone (THQ), are also optional ingredients. In addition, some molding compositions such as sheet molding compound (SMC) or bulk molding compound (BMC) must be "thickened" to facilitate handling after mixing the glass reinforcement with the filled polyester resin formulation. This thickening is usually done by mixing in a "B-side" which contains a mineral base such as magnesium or calcium oxide and/or hydroxide. The residual carboxylic acid ends on the polymers in the resin composition react with the base and tie the chain together with an ionic bond. This introduces the required thickening by increasing the molecular weight of the polymer and thus its "apparent viscosity." Other thickening mechanisms such as polymer crystallization or urethane bond formation can also be used.

For utilization of the dimer acid derivatives covered by this invention, the above described ingredients were processed into sheet-molding compound, according to standard methods. These materials could also be used in bulk molding compound, resin transfer molding, and other polyester composite processing techniques.

In examples 1–3 resins, additives, and catalysts were blended with a Cowles mixer, then fillers and internal mold release agent sheared in at ~3000 rpm. Care was taken to ensure this paste was mixed to homogeneous consistency and uniform temperature. The thickening agent, a magnesium oxide dispersion, was mixed in immediately prior to processing across the SMC machine. SMC was allowed to mature to 35–40 mm cps (HBT 1×viscometer, Tf spindle @ 1 rpm), approximately 2–4 days, and molded. For test plaques, a 454 gram charge was molded at 1000 psi on a 12 in.×12 in.×0.100 in. Class-A flat plaque tool. Panels were typically tested with a LORIA surface quality analyzer, and submitted for tensile and flexural properties and 24-hour water absorption.

In the following examples all parts are by weight and in the metric system unless otherwise specified. All references cited herein are hereby incorporated by reference.

Examples A, B and C describe the preparation of various dimer acid derivatives and polyester polyols of the invention which enhance the performance of thermoplastic low profile additives in sheet molding compound (SMC).

Example A

Dimer acid additive A (used in Examples 1, 2 and 3) was prepared in the following manner. 354.3 grams dimer acid (Empol 1018, 79% dimer, 17% trimer acid, AV=190–198 mgKOH/g., provided by Henckel Corporation, Emery Group, Cincinnati, Ohio) and 102.0 grams propylene glycol were charged to a 1-liter resin kettle equipped with distillation apparatus for removal of water of condensation. Under inert (N2) sparge, temperature was slowly increased to 205° C., removing ~20 grams water. The dimer acid propylene glycol reaction product was held at 205° C. until the acid value was less than 1. The reacted material was removed from the kettle, and used at 100% solids. Final acid value was <1 mgKOH/g, [OH] value 144–150 mgKOH/g., and viscosity ~4000 cps (Brookfield RVT viscometer).

Example B

Dimer acid additive B (used in Examples 1 and 2) was prepared in the following manner. 536.25 grams Empol 1018 dimer acid and 218.63 grams diethylene glycol were charged to a 1-liter resin kettle equipped with distillation apparatus for removal of water of condensation. Under inert sparge, temperature was slowly increased to 205° C., removing ~30 grams water. The dimer acid diethylene glycol reaction product was held at 205° C. until the acid value was less than 1. The reacted material was removed from the kettle, and used at 100% solids. Final acid value was <1mgKOH/g, [OH]~150 mgKOH/g, and viscosity 3200–3800 cps.

Example C

Dimer acid derivative C (used in Examples . . . ) was prepared in the following manner. 290 grams Empol 1018 dimer acid and 400 grams poly(ethylene glycol) (Mn=400) were charged to a 1-liter resin kettle equipped with distillation apparatus for removal of water of condensation. Under inert sparge, temperature was lowly increased to 205° C., removing ~15 grams water. Resin was held at 205° C.

until acid value dropped below 1. The reacted material was removed from kettle, and used at 100% solids. Final acid value was <1 mgKOH/g, [OH]=85–89, and viscosity 2200–2600 cps.

EXAMPLES

The following examples illustrate the usage of dimer acid derivatives as additives in SMC formulations.

Example 1

| COMPONENT | #1 Phr | #2 Phr | #3 Phr |
|---|---|---|---|
| AROPOL Q6585[1] | 64.46 | 64.46 | 64.46 |
| URALLOY 2020[2] | 27.97 | 27.97 | 27.97 |
| Styrene | 5.02 | 5.02 | 5.02 |
| Additive A | | 5 | |
| Additive B | | | 5 |
| VDI cobalt accelerator[3] | 0.05 | 0.05 | 0.05 |
| Butyl hydroxytoluene | 0.05 | 0.05 | 0.05 |
| t-butyl perbenzoate | 1.5 | 1.5 | 1.5 |
| Zinc stearate | 4.5 | 4.5 | 4.5 |
| Calcium carbonate | 220 | 220 | 220 |
| B-side (7.33% MgO dispersion) | 15.1 | 15.1 | 15.1 |
| Additive A = dimer acid/PG | | | |
| Additive B = dimer acid/DEG | | | |
| LORIA SQ index | 57 | 47 | 52 |

[1]Amorphous unsaturated polyester resin (propylene glycol and maleic acid), acid value 28–32, 65% non-volatiles in styrene, available from Ashland Specialty Chemical Co.
[2]urethane linked saturated polyester low-profile additive, available from Ashland Specialty Chemical Co.
[3]a cobalt-organic acid salt (12% metal) available from Mooney Chemicals Example 1 shows that addition of additives A and B into standard formulation #1 improves surface quality, as measured by LORIA surface analyzer. Formulation #2 shows a 10-point drop in LORIA index, while Formulation #3 shows a 5-point drop.

Example 2

Formulation #1 is a control system, 50% non-volatiles, 1.85:1 base resin:LPA ratio. Formulations #2, 3 and 4 show variations on the control system (#1) with dimer acid derivatives. Incorporation of these additives resulted in 7–10 point drop in LORIA index over the control. Formulation #5 is a different control system, 50% non-volatiles, 2.3:1 base resin:LPA ratio. Formulations #6 and 7 show variation on control system (#5), where incorporation of dimer acid derivatives resulted in 14-point drop in LORIA index. When comparing formulations 1–4 and 5–7, it is apparent that the dimer acid derivatives provide a stronger surface quality enhancing benefit in SMC systems with a reduced LPA content.

Example 3

| COMPONENT | #1 Phr | #2 Phr |
|---|---|---|
| AROPOL Q6585 | 52.3 | 52.3 |
| LP40A[4] | 37.5 | 31.25 |
| Styrene | 7.9 | 11.65 |
| Additive A | | 2.5 |
| t-butyl perbenzoate | 1.5 | 1.5 |
| Zinc stearate | 4.5 | 4.5 |
| Calcium carbonate | 200 | 200 |
| B-side A (9.7% MgO dispersion) | 10 | 10 |
| Additive A = dimer acid/PG | | |
| LORIA SQ index | 105 | 85 |

[4]polyvinyl acetate low-profile additive, 40% non-volatiles in styrene

Example 3 shows effect of dimer acid derivatives on systems based on unsaturated polyester base resin and poly(vinyl acetate) low-profile additive. Formulation #1 is control system without additive, LORIA surface quality index of 105. Formulation #2, with 2.5 phr dimer acid derivative and reduction of poly(vinyl acetate) level shows 20-point reduction in surface quality index.

| | #1 | #2 | #3 | #4 | #5 | #6 | #7 |
|---|---|---|---|---|---|---|---|
| COMPONENT | Phr | phr | phr | phr | phr | phr | phr |
| AROPOL Q6585 | 48.3 | 48.3 | 48.3 | 48.3 | 52.3 | 52.3 | 52.3 |
| URALLOY LP 85-05 | 42.4 | 36.13 | 36.13 | 42.4 | 36.7 | 36.7 | 36.7 |
| Styrene | 6.7 | 10.4 | 10.4 | 6.7 | 8.78 | 8.78 | 8.78 |
| Additive A | | 2.5 | | | | | |
| Additive B | | | | | | 5 | |
| Additive C | | | 2.5 | 5 | | | 5 |
| 12% Cobalt Naphthenate | 0.1 | 0.1 | 0.1 | 0.1 | 0.1 | 0.1 | 0.1 |
| Butyl hydroxytoluene | 0.08 | 0.08 | 0.08 | 0.08 | 0.1 | 0.1 | 0.1 |
| t-butyl perbenzoate | 1.5 | 1.5 | 1.5 | 1.5 | 1.5 | 1.5 | 1.5 |
| Zinc stearate | 4.5 | 4.5 | 4.5 | 4.5 | 4.5 | 4.5 | 4.5 |
| Calcium carbonate | 200 | 200 | 200 | 200 | 230 | 230 | 230 |
| B-side A (9.7% MgO dispersion) | 11 | 11 | 11 | 11 | 12 | 12 | 12 |
| Additive A = dimer acid/PG | | | | | | | |
| Additive B = dimer acid/DEG | | | | | | | |
| Additive C = dimer acid/PEG | | | | | | | |
| LORIA SQ index | 102 | 95 | 92 | 92 | 96 | 82 | 82 |

Example 2 shows improvements in surface quality in polyester SMC formulations based on Ashland Specialty Chemical Company's AROPOL Q6585 unsaturated polyester base resin and URALLOY LP85–05 low-profile additive.

We claim:

1. A resin composition comprising
   A. an unsaturated polyester resin,
   B. a thermoplastic low profile additive selected from the group consisting of polyurethanes, polyvinylacetates, polyacrylates, polymethacrylates, saturated polyesters, styrene polymers and mixtures thereof,
   C. an olefinically unsaturated monomer capable of copolymerizing with the unsaturated polyester resin, and
   D. a polycapped oligomer having a number average molecular weight of less than 2000 which is incompatible with the curing unsaturated polyester resin and the olefinically unsaturated monomer, where the polycapped oligomer is prepared by capping a dimer acid with a glycol, a polyether polyol or mixture thereof.

2. The resin as claimed in claim 1, wherein the dimer acid is a $C_{36-44}$ aliphatic diacid.

3. The resin as claimed in claim 1, wherein the glycol reacted with the dimer acid is propylene glycol, diethylene glycol, polyethylene glycol or propylene glycol.

4. The resin as claimed in claim 1, comprising;
   A. an unsaturated polyester resin,
   B. a thermoplastic low profile additive,
   C. an olefinically unsaturated monomer capable of copolymerizing with the unsaturated polyester resin, and
   D. a polycapped oligomer with a number average molecular weight of less than 2000 which is incompatible with the curing unsaturated polyester resin and the olefinically unsaturated monomer where the polycapped oligomer is prepared by capping a $C_{36-44}$ dimer acid with propylene glycol, diethylene glycol, polyethylene glycol, propylene glycol or a mixture thereof.

5. The resin as claimed in claim 1, wherein the olefinically unsaturated monomer capable of copolymerizing with the unsaturated polyester resin is styrene.

6. A method of improving the performance of a thermoplastic low profile additive in a thermoset molding composition comprising;
   A. an unsaturated polyester resin,
   B. a thermoplastic low profile additive, and
   C. an olefinically unsaturated monomer capable of copolymerizing with the unsaturated resin,
   by adding
   D. a polycapped oligomer having a number average molecular weight of less than 2000, which is incompatible with the curing unsaturated polyester resin and the olefinically unsaturated monomer, where the polycapped oligomer is prepared by capping a dimer acid with a glycol, a polyether polyol of mixture thereof.

7. The method as claimed in claim 6, wherein the polycapped oligomer is a $C_{36-44}$ dimer acid capped with a glycol.

8. The method as claimed in claim 6, wherein the polycapped oligomer is a $C_{36-44}$ dimer acid capped with a polyether polyol.

9. A cured thermoset polyester molded article comprising the reaction product of;
   A. an unsaturated polyester resin,
   B. a thermoplastic low profile additive,
   C. an olefinically unsaturated monomer capable of copolymerizing with the unsaturated polyester resin, and
   E. a polycapped oligomer which is incompatible with the curing unsaturated polyester resin and the olefinically unsaturated monomer, where the polycapped oligomer with a number average molecular weight of less than 2000 is prepared by capping a dimer acid with a glycol, polyether polyol or mixtures thereof.

* * * * *